(12) United States Patent
Winter

(10) Patent No.: US 8,757,648 B1
(45) Date of Patent: Jun. 24, 2014

(54) CONTROL ARM ASSEMBLY WITH BALL JOINT FOR AUTOMOTIVE SUSPENSION

(71) Applicant: Mevotech Inc., Toronto (CA)

(72) Inventor: Simon Winter, Toronto (CA)

(73) Assignee: Mevotech LP, Ontario (CA)

( * ) Notice: Subject to any disclaimer, the term of this patent is extended or adjusted under 35 U.S.C. 154(b) by 0 days.

(21) Appl. No.: 13/886,319

(22) Filed: May 3, 2013

(51) Int. Cl.
*B60G 7/00* (2006.01)
*F16C 11/06* (2006.01)

(52) U.S. Cl.
CPC ............ *B60G 7/005* (2013.01); *F16C 11/0695* (2013.01)
USPC .................. 280/93.511; 280/124.134; 403/77; 403/122

(58) Field of Classification Search
CPC . B60G 7/005; F16C 11/0619; F16C 11/0695; F16C 11/0614; F16C 11/0623
USPC .......... 280/93.511, 124.134; 403/75–77, 126, 403/122
See application file for complete search history.

(56) References Cited

U.S. PATENT DOCUMENTS

| | | | |
|---|---|---|---|
| 2,900,196 A | 1/1958 | Nienke | |
| 2,848,260 A | 8/1958 | Moskovitz | |
| 2,977,131 A | 3/1961 | Moskovitz et al. | |
| 3,061,344 A | 10/1962 | Gray et al. | |
| 3,415,551 A | 12/1968 | Korecky et al. | |
| 6,550,120 B1 | 4/2003 | Maughan et al. | |
| 2009/0014977 A1 | 1/2009 | Molenaar | |
| 2011/0033226 A1* | 2/2011 | Kuroda | 403/122 |
| 2011/0135381 A1* | 6/2011 | Wilcutt et al. | 403/122 |
| 2012/0093573 A1 | 4/2012 | Molenaar | |

* cited by examiner

*Primary Examiner* — Drew Brown
(74) *Attorney, Agent, or Firm* — Norton Rose Fulbright Canada LLP; Paul J. Field

(57) ABSTRACT

A control arm assembly for an automotive wheel suspension, having: an elongate control arm having a transverse mounting socket with an internally threaded surface; and a ball joint having: a steel housing with an externally threaded surface and; a ball stud with a partially spherical ball head upwardly restrained within the housing and a shank extending upwardly through an upward opening in the housing; and a bearing having a partially spherical inner surface engaging the ball head and having an outer surface engaging the inner chamber; wherein the housing has a laterally extending collar with a lower contact surface that engages the upper mounting surface of the control arm when the threaded surfaces are fully torqued together; and wherein the upper portion of the outboard wall having a thickness greater than or equal to a thickness of a lower portion.

11 Claims, 6 Drawing Sheets

CONTROL ARM ASSEMBLY WITH BALL JOINT FOR AUTOMOTIVE SUSPENSION

TECHNICAL FIELD

The invention relates to control arm assembly with a control arm and a ball joint for use in an automotive suspension system.

BACKGROUND OF THE ART

The use of ball joints allows pivoting movement of the suspension and steering components relative to each other while retaining the capacity to transmit axial and shear forces to accommodate wheel movement, steering movement and maintain wheel alignment.

For example, a MacPherson strut suspension uses a substantially vertical strut housing a shock absorber and spring to connect a wheel hub carrier or knuckle to an automotive body. The strut can rotate about a vertical axis to provide steering for the wheel and a lower control arm is necessary to hold the lower end of the strut in position to resist lateral movement. The inboard end of the control arm is hinged to the automotive chassis and the outboard end is connected to the wheel hub carrier with a ball joint. Excessive wear of the ball joint bearings results in steering, suspension and wheel alignment inaccuracy which is corrected by replacement of the ball joint.

Manufacturers involved in the design of automotive aftermarket parts often seek to improve upon the original equipment manufacturer's designs (OEM) when providing replacement parts. A purchaser, such as an auto repair shop, can simply replace a worn part with an identical new part manufactured to the specifications of the original equipment manufacturer (OEM). However improvements are desirable to avoid merely repeating the same premature wear experienced with the OEM part and to enhance the aftermarket manufacturer's market share by providing the purchaser with a performance improvement incentive to purchase from the aftermarket manufacturer instead.

Any improved replacement part must approximate the original mass of the OEM suspension since significant alteration of the mass could detrimentally effect the operation of the suspension. The improved replacement part must also be limited to the space provided in the OEM vehicle to avoid the need to modify adjacent components and prevent interference.

An example of accelerated wear and deterioration is seen in the suspension and steering system of a vehicle having a control arm forged or cast of a lightweight non-ferrous material such as aluminum where the outboard end includes a ball joint mounted in a socket with polymer bearings. Various factors of the OEM design contribute to accelerated wear, premature failure and repair expenses.

Severe space restrictions in the suspension and steering designs of some vehicles exist where the ball joint and outboard end of the control arm are located relatively close to the adjacent brake rotor. The limited space available reduces the ability to improve the design by taking the obvious route of simply increasing material around the outboard end of the control arm. Space is extremely limited to the extent that the OEM has opted in some cases to cut out an adjacent portion of the brake rotor shield to allow more space for the ball joint and control arm.

The ball joint is exposed to high temperature caused by the close proximity to the brake rotor. Generally a brake disc shield is provided about the brake rotor to reduce heat transfer to adjacent vehicle parts and to prevent exposure of moving parts to brake dust particles generated during the wearing of the brake pads against the brake rotor. Polymer bearings deteriorate in high heat conditions. The abrasive brake dust penetrates into the ball joint and is captured in the lubricant between moving parts which causes increased wearing of the polymer bearings. The removal of a portion of the brake shield in some designs provides more space for the ball joint and outboard end, but also results in increased exposure of the ball joint to heat and dust which accelerates wear.

The choice of polymer bearings for the ball joint combined with increased exposure to heat and dust from braking therefore has resulted in premature failure. Brake dust, road salt and sand particles can penetrate the seals of a ball joint and mix with the lubricant grease. The wear experienced by the polymer bearing is accelerated and causes excessive axial and radial play in the ball joint.

A control arm assembly uses forged or cast non-ferrous or aluminum control arms with a socket machined in the outboard end to house polymer bearings and ball stud of the ball joint. The OEM control arm assembly has a low weight, low cost and is simple to manufacture. Accelerated wear results however from the design choices made by the OEM. The low weight and low cost OEM design limits the adoption of aftermarket improvements to extend the cycle life of the control arm assembly, since improvements generally add material or add weight or both.

For example, the aftermarket parts industry has improved ball joint lifespan and durability by using sintered metal bearings manufactured from metal powder which have advantages over polymer bearings. Sintered metal bearings are porous and the lubricant penetrates the bearing surfaces improving lubrication of the surfaces of adjacent moving parts. Sintered metal is more durable at lower temperatures better than polymers and withstands high temperature environments better than polymers. Sintered metal has better wear characteristics than polymers and sintered metal does not degrade due to chemical incompatibility with grease formulations like polymers.

Replacement of sintered bearings for the polymer bearings of an OEM control arm assembly is relatively simple when done by a replacement parts manufacturer.

Bearing replacement is impractical and uneconomical for a mechanic other than during replacement of an entire manufactured ball joint or control arm assembly consisting of a preassembled control arm and ball joint. Using the OEM geometry and functional dimensions of the OEM control arm assembly, sintered metal bearings are located with the ball stud in a socket of a replacement control arm. However when a non-ferrous or aluminum control arm is used, use of press fit sintered hardened metal bearings would quickly wear away at the adjacent softer control arm material of the socket during operation. Press fitting of sintered metal bearings also exerts an additional radial stress and circumferential tensile stresses on the adjacent aluminum material of the control arm socket which is not experienced with low strength polymer bearings.

It is desirable to extend the cycle life of the ball joint, to avoid overstressing of the outboard end of the aluminum control arm in which the ball joint is mounted, maintain use of a light weight non-ferrous or aluminum control arm, maintain dimensional clearances between the ball joint, the control arm and adjacent components during operation and to maintain components in their original OEM alignment.

Features that distinguish the present invention from the background art will be apparent from review of the disclosure, drawings and description of the invention presented below.

DISCLOSURE OF THE INVENTION

The invention provides a control arm assembly for an automotive wheel suspension, having: an elongate control arm of lightweight or non-ferrous material having: an inboard end adapted to pivotally mount to an automotive chassis; and an outboard end having a transverse mounting socket, through an upper mounting surface, the transverse mounting socket having an internally threaded surface and defining an outboard wall between the mounting socket and an outboard sweep surface; and a ball joint having: a steel housing with an externally threaded surface and an inner chamber; a ball stud with a partially spherical ball head upwardly restrained within the inner chamber and a shank extending upwardly through an upward opening in the housing; and a bearing having a partially spherical inner surface engaging the ball head and having an outer surface engaging the inner chamber; wherein the housing has a laterally extending collar with a lower contact surface that engages the upper mounting surface of the control arm when the threaded surfaces are fully torqued together; and wherein the ball head has a center of rotation laterally adjacent an upper portion of the outboard wall, the upper portion having an upper wall thickness greater than or equal to a lower wall thickness of a lower portion of the outboard wall.

To avoid direct contact between the hard sintered metal bearings and a softer non-ferrous or aluminum control arm socket, it is possible to house the bearings in a steel cup or ball joint housing that is press fit into the socket. However the outer dimensions of the control arm are limited by the space available and the use of a steel cup housing increases the size of the socket required compared to use of polymer bearings directly mounted in a non-ferrous or aluminum socket. The size of the ball head is fixed and the operating envelope of the control arm end is limited within a narrow range. Therefore the design of material between the ball head and outer surface of the control arm end comes down to taking material space from one part and consuming that space for another part. Hence the wall thickness of the control arm end, between the socket and the outer surface, must be reduced to accommodate the steel housing which then weakens the end area of the control arm. Further the forces involved in press fitting or interference fitting of the ball joint housing into the control arm socket, introduce circumferential tensile stresses or hoop stresses in the end area of the control arm adjacent to the socket. Press fitting would reduce wall thickness and increase tensile stresses in the end area of the control arm adjacent to the socket, which is undesirable and could lead to premature failure or fatigue cracking of the aluminum control arm material.

The invention avoids the severe disadvantages of press fitting a ball joint housing by use of a threaded engagement and adhesive between the aluminum control arm and the steel ball joint housing. The machining of internal threads on the inside surface of the control arm socket does not impose additional hoop stress or leave residual stresses in the non-ferrous or aluminum material. A locking adhesive is used on the threaded surfaces to provide a permanent threaded connection and further isolates the dissimilar metals (steel, aluminum, lightweight alloys) with an adhesive layer that impedes localized metal corrosion.

By utilizing a threaded ball joint housing, the stresses imposed on the control arm by torquing of the housing into the socket, are dissipated into the control arm material in an axial direction where there is sufficient material to support the loading. A much lesser degree of additional radial load is imposed on the control arm socket area by the threaded connection compared to an interference press fit connection. Accordingly the aluminum material of the threaded control arm socket is protected from direct wear and contact with the sintered metal bearings by the threaded steel housing acting as a protective liner or sleeve that dissipates locally applied bearing loads.

DESCRIPTION OF THE DRAWINGS

In order that the invention may be readily understood, one embodiment of the invention is illustrated by way of examples in the accompanying drawings.

FIG. 3 shows a prior art assembly and FIG. 4 shows an embodiment of the invention.

FIG. 5 shows a prior art assembly and FIG. 6 shows an embodiment of the invention.

Further details of the invention and its advantages will be apparent from the detailed description included below.

DETAILED DESCRIPTION OF PREFERRED EMBODIMENTS

Figure 1:
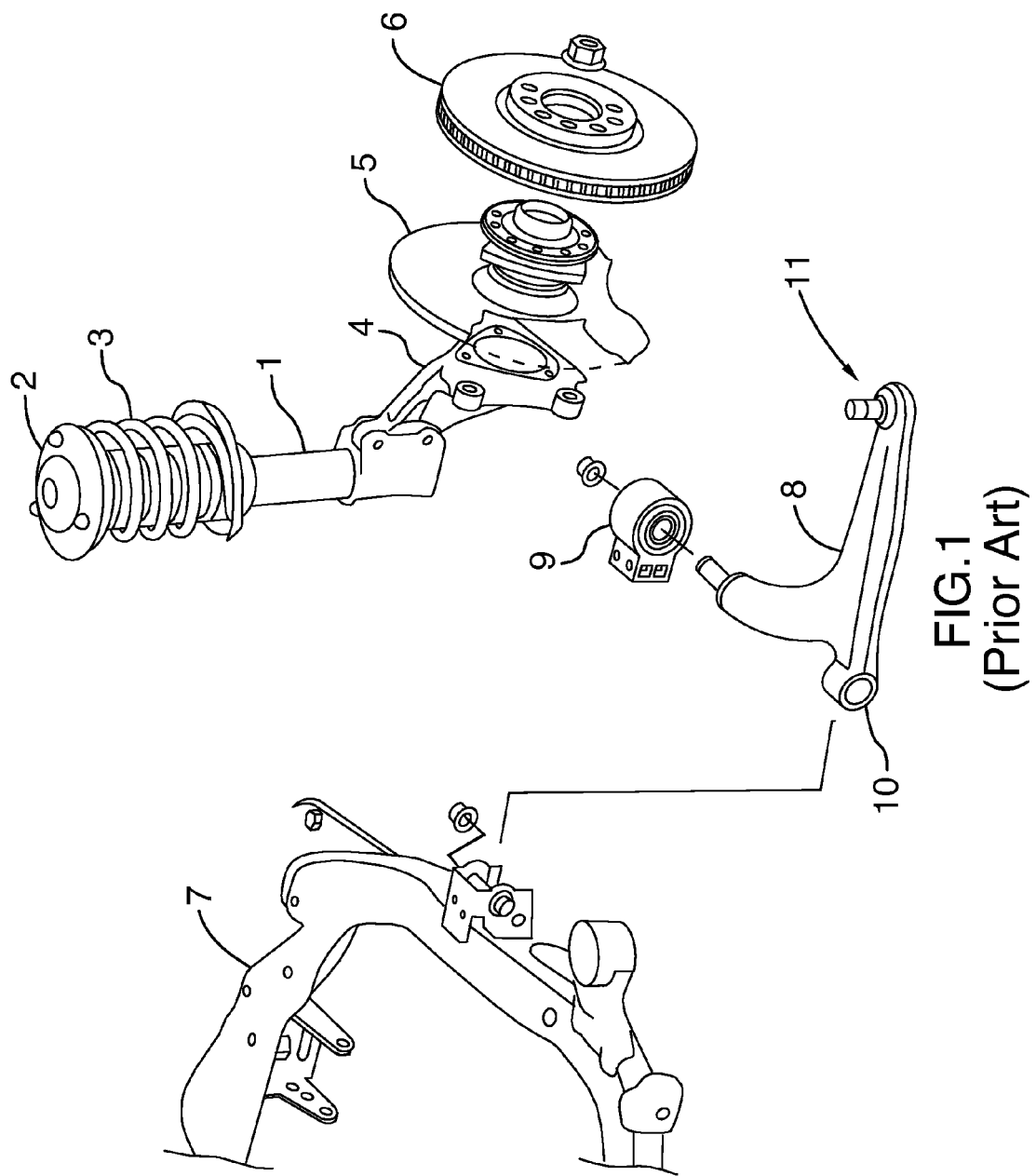
FIG. 1 is an exploded axonometric view of a conventional MacPherson strut automotive suspension for a front left (driver side) wheel.

FIG. 1 shows an exploded view of the relevant components of a conventional prior art MacPherson strut or three-point automotive suspension for a front left wheel. The strut 1 is a substantially vertical tube with an upper mount 2 that is secured to the vehicle body (not shown). The strut 1 houses a shock absorber (not shown) and coil spring 3. A lower end of the strut 1 has a knuckle or hub carrier 4 which supports the axle 12 (shown in FIG. 2), brake shield 5 and brake rotor 6.

The strut 1 is joined to the vehicle chassis 7 with a control arm assembly 8 that is hinged to the chassis 7 with a rearward bushing 9 and forward bushing 10. The control arm assembly 8 includes a ball joint 11 with a ball stud (shank 18 and ball head 15 shown in FIGS. 5-7) that is joined to the underside of the hub carrier 4.

Figure 2:
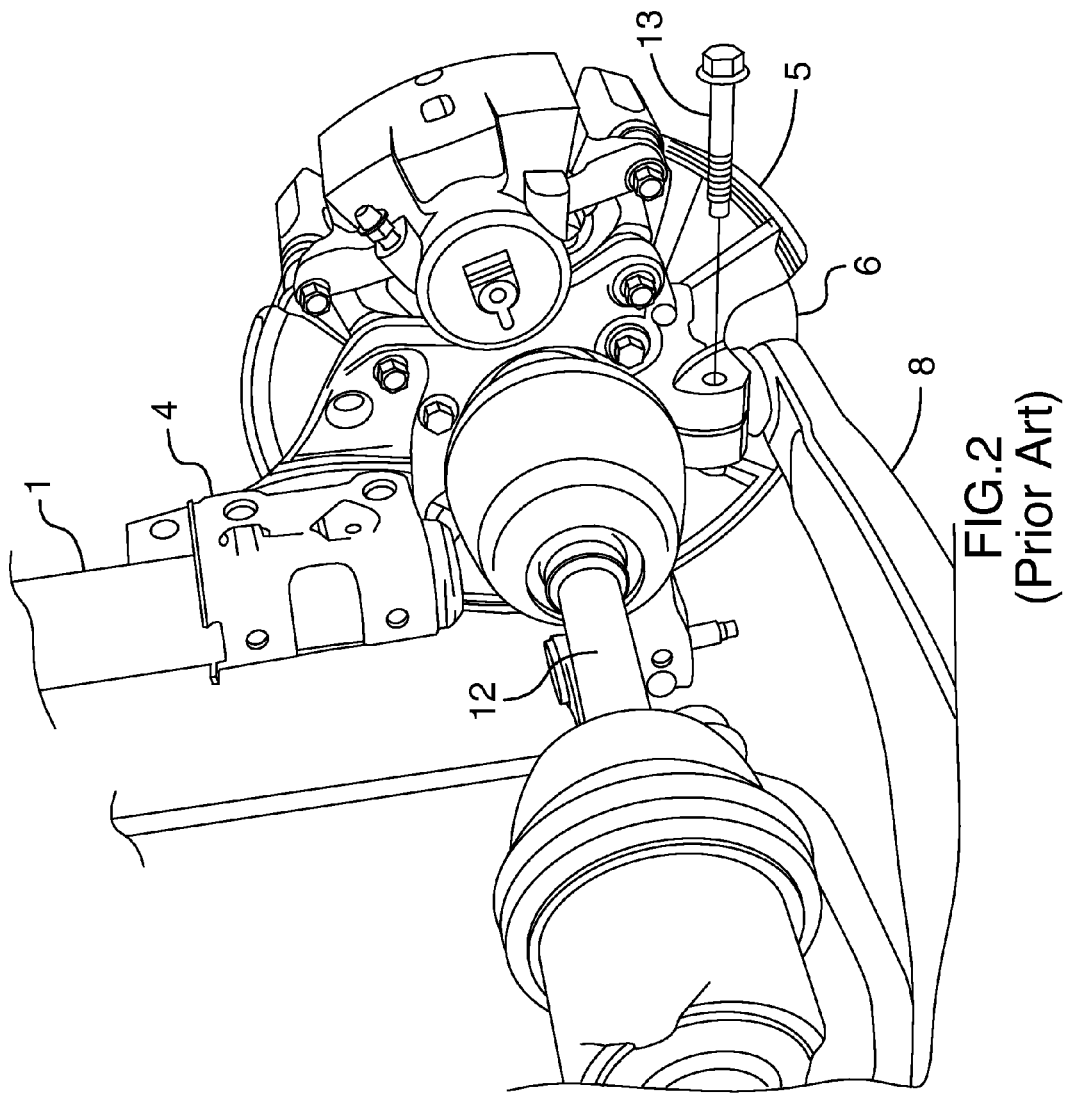
FIG. 2 is an axonometric view of the conventional MacPherson strut automotive suspension of FIG. 1 assembled together and also including the front wheel drive axle.

FIG. 2 shows an axonometric view of the suspension of FIG. 1 assembled together and also including the front wheel drive axle 12. The strut 1 and hub carrier 4 support the brake rotor 6 which can be seen through a cutout in the brake shield 5. The upper end of the ball stud is joined to a matching bore in the lower end of the hub carrier 4 with a bolt 13.

Figure 3:
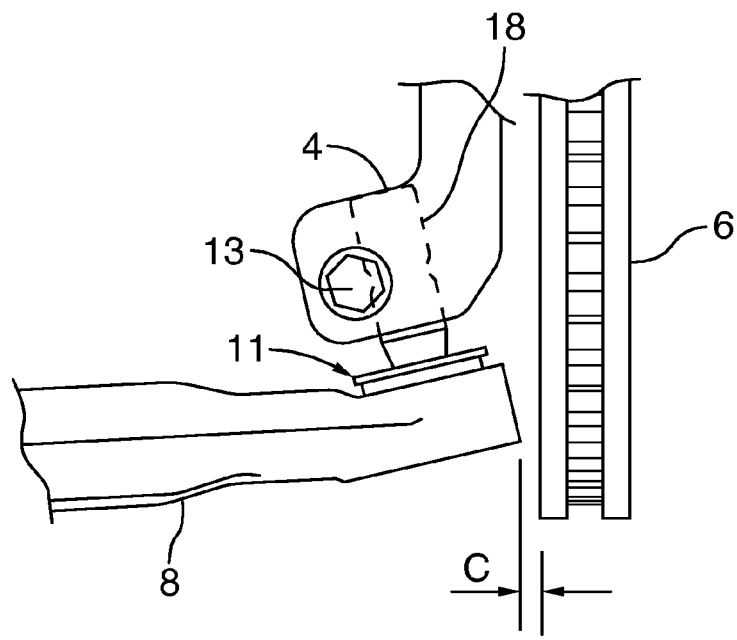
FIGS. 3 and 4 show elevation views of a partial brake rotor, lower end of a MacPherson strut hub carrier or knuckle, and the outboard end of a control arm with ball joint, where
Figure 4:
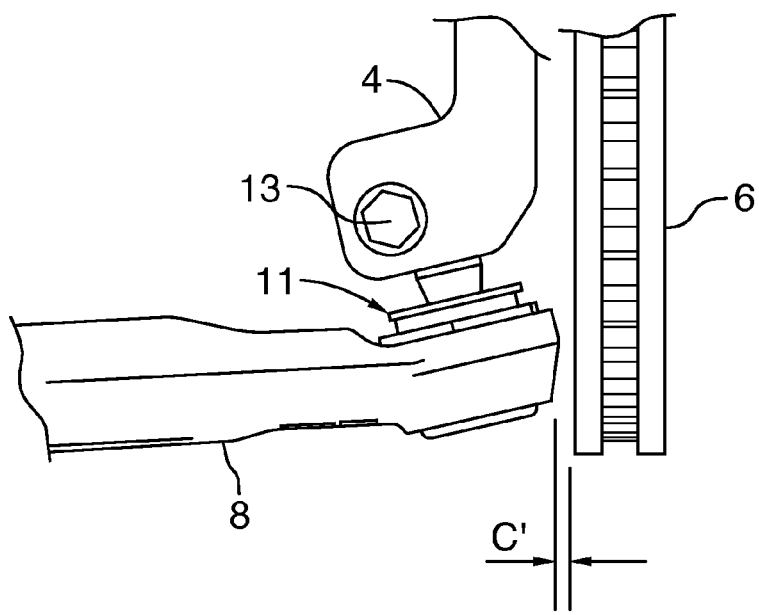

FIGS. 3 and 4 show elevation views of a partial brake rotor 6, lower end of the hub carrier 4, bolt 13, and the outboard end of the control arm assembly 8 with ball joint 11. FIG. 3 shows a prior art assembly and FIG. 4 shows an example embodiment of the invention. The main purpose of FIGS. 3 and 4 is to emphasize the very limited space or clearance between the outboard end of the control arm assembly 8 and the brake rotor 6, which are indicated as dimensions C and C'.

Figure 5:
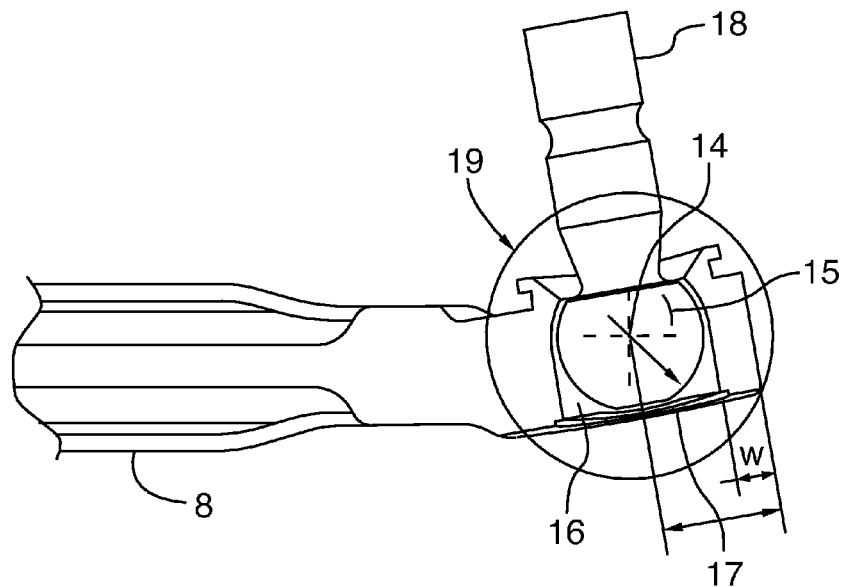
FIGS. 5 and 6 show sectional elevation views of the outboard end of a control arm with ball joint, where
Figure 6:
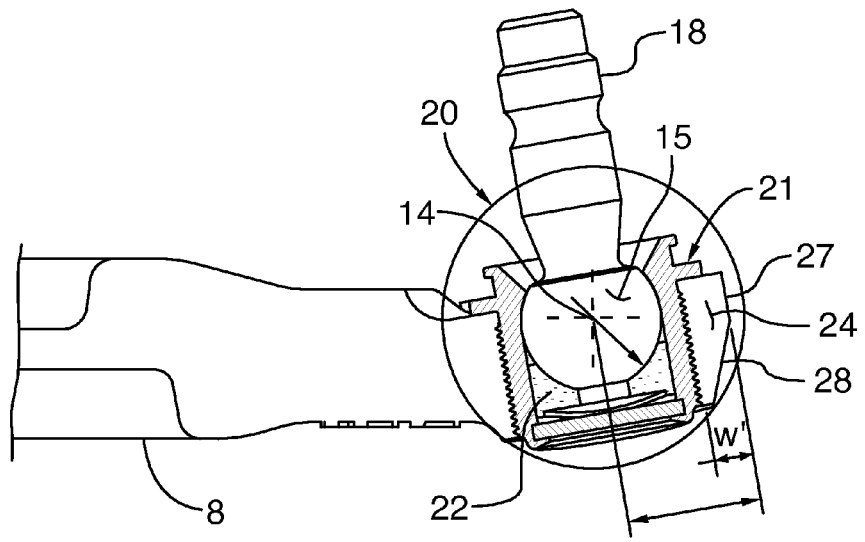

As best seen in FIGS. 5 and 6, it will be understood that the control arm assembly 8 rotates about a center 14 of the spherical ball head 15 relative to the brake rotor 6 and hub carrier 4. The clearance dimensions C and C' are maintained during movements of the control arm assembly 8 during normal operating conditions. The slight difference shown between dimension C in the prior art OEM design of FIG. 3 and dimension C' in the embodiment of the invention shown in FIG. 3, illustrates that a slight reduction in clearance can be of advantage. Since clearance is so limited, even a slight reduction can be of benefit. Use of a threaded housing and sintered metal bearings requires sufficient wall thickness surrounding the ball joint and avoidance of interference with the brake rotor 6. For example decrease in the clearance C compared to C' of 0.100 inch can have a beneficial effect on the minimum wall thickness surrounding the ball joint.

FIG. 5 shows a conventional prior art OEM control arm assembly 8 where a socket is machined in the outboard end to house polymer bearings 16. The spherical ball head 15 is secured in the socket with a closure plate 17 and the stud shank 18 extends to be connected with the bolt 13 to the hub carrier 4 as indicated in FIG. 3. The minimum wall thickness W determines the imaginary operating envelope 19 within which the control arm assembly 8 rotates about the ball head 15 and likewise determines the OEM clearance C shown in FIG. 3.

FIG. 6 shows the example embodiment of the invention with a slightly larger imaginary operating envelope 20 which consequently provides a slightly smaller clearance dimension C' shown in FIG. 4. However within the confines of the operating envelope 20, the maximum wall thickness W' has been found to have sufficient load resisting capacity to allow use of a steel threaded housing 21 and sintered metal bearings 22, as better shown in FIG. 7.

Figure 7:
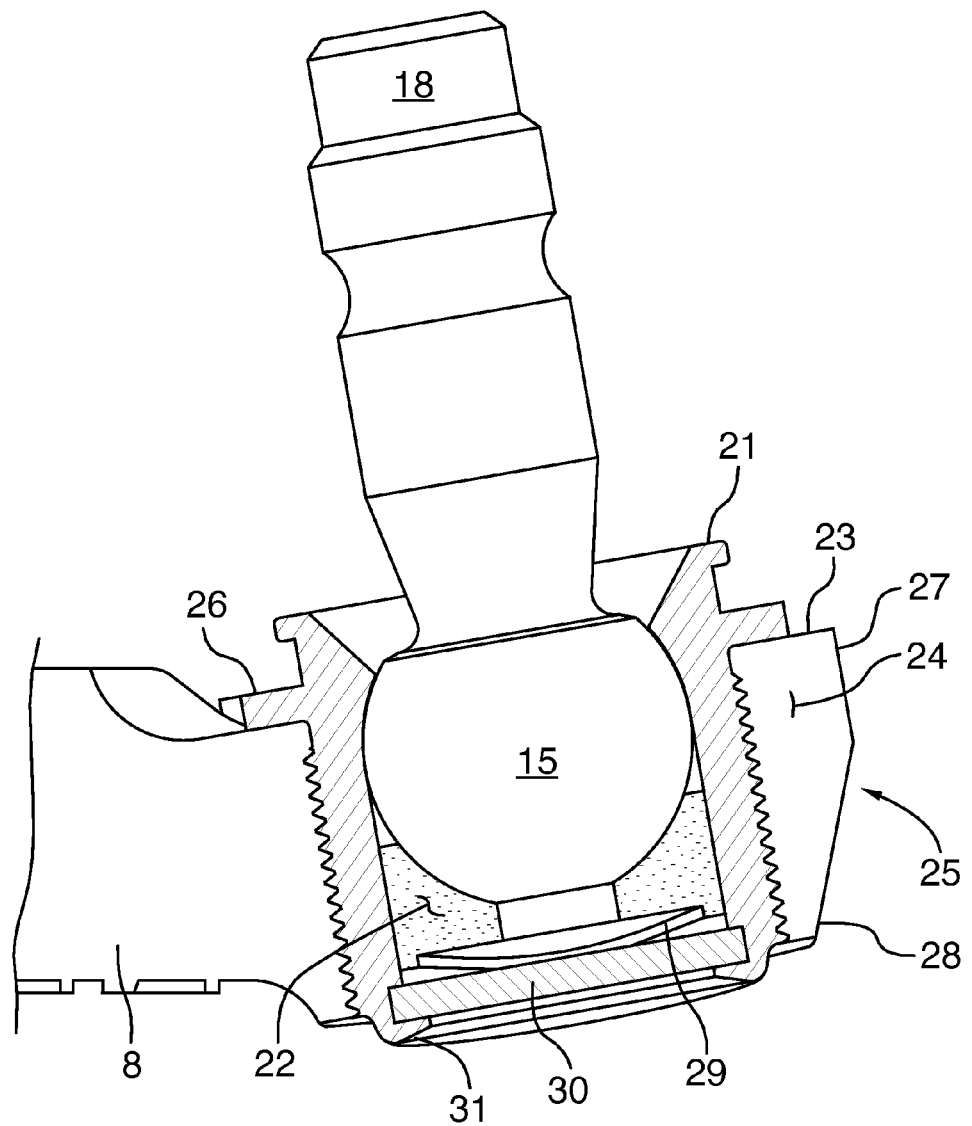
FIG. 7 shows a detailed sectional view of the outboard end of a control arm with ball joint of FIG. 6.

FIG. 7 shows a close up view of the outboard end of the control arm assembly 8 of FIG. 6 for added clarity. The control arm assembly 8 includes an elongate control arm 8 made of forged or cast non-ferrous or aluminum material which, as shown in FIG. 1, has an inboard end with bushings 9, 10 adapted to pivotally mount to the automotive chassis 7 and an outboard end, as shown in FIG. 7, having a transverse mounting socket with internal threads and extending through an upper mounting surface 23. The transverse mounting socket defines an outboard wall 24 between the mounting socket a downwardly beveled outboard sweep surface 25. As shown in FIG. 6 the beveled surface 25 allows for clearance C' while also providing additional internal wall material to resist loads where needed most.

The ball joint 11 has an externally threaded steel housing 21 with an externally threaded surface and an inner chamber. The control arm 8 is made of non-ferrous metal or aluminum to maintain the OEM mass characteristics and the housing 21 is made of cast and machined steel for enhanced strength and wear characteristics. The ball stud has a partially spherical ball head 15 that is upwardly restrained within the inner chamber of the housing 21 and the ball stud shank 18 extends upwardly through an upward opening in the housing 21. The sintered metal bearing 22 is an annular ring with a partially spherical inner surface engaging the ball head 15. The sintered metal bearing 22 has an outer cylindrical surface engaging the inner chamber of the housing 21. As seen in FIG. 7, the bearing 22 has an outer or lower end and the bearing 22 is resiliently biased against the ball head 15 by a spring washer 29 in engagement with the outer end. The spring washer 29 is retained in place with a closure disc 30 and the peripheral edge 31 of the housing 21 is rolled over the disc 30 after all components are assembled inside the housing 21.

The housing 21 has a laterally extending collar 26 with a lower contact surface that engages the upper mounting surface 23 of the control arm 8 when the threaded surfaces are fully torqued together. The collar 26 has a wrench engaging periphery such as a hexagonal profile so it can be rotated into position. The collar 26 also includes a peripheral dust boot retention groove 32. The dust boot is not shown.

As seen in FIG. 6, the ball head 15 has a center of rotation 14 laterally adjacent an upper portion 27 of the outboard wall 24, the upper portion 27 having an upper wall thickness W' greater than or equal to the thickness of a lower portion 28 of the outboard wall 24.

Accordingly the wall thickness corresponds with the stresses exerted on the aluminum material of the outboard wall 24. Because the center 14 of the ball head 15 is located in an upper portion of the housing 21, the forces exerted by the ball head 15 will be resisted mainly by the adjacent upper portion 27 of the outboard wall 24. The lower portion 28 can be of reduced thickness, such as being beveled downwardly as illustrated, since the distribution of loads will result in lower stress in that area. Reduced thickness in the lower portion 28 allows the clearance C' between the control arm 8 and the brake rotor 6 (see FIG. 4) to be maintained during movement.

Also the laterally extending collar 26 exerts axial force on the upper mounting surface 23 of the control arm 8. The axial force induces stress in the upper portion 27 of the outboard wall 24 to a greater extent than stresses induced in the lower portion 28 by the interaction of the threaded surfaces. Since the collar 26 exerts an axial force on the upper mounting surface 23, the housing 21 experiences the highest axial tension immediately beneath the collar 26 and the control arm experiences the highest axial compression immediately beneath the collar 26. The stresses on the material of the housing 21 and control arm lead to strain, i.e. stretching of the housing 21 in tension and shrinking of the adjacent control arm material in compression, so that the axial force is distributed axially in a manner that results in higher stress adjacent the collar 26 and lower stress distant from the collar 26.

The threaded surfaces are coated with a thread locking adhesive (not shown) to permanently connect and fuse the control arm 8 and housing 21. Vibration during operation could otherwise cause the housing 21 to loosen. The adhesive also impedes local corrosion between the dissimilar metals of the non-ferrous or aluminum control arm 8 and steel housing 21.

In the embodiment illustrated, the housing 21, ball head 15 and shank 18 are made of steel. The partially spherical upper bearing surface of the housing 21 and a matching portion of the ball head 15 are case hardened for enhanced wear resistance. Where axial space is available, an annular upper bearing (not shown) of sintered metal similar to the lower bearing 22 could also be located in the housing 21 in place of the case hardened surfaces illustrated.

EXAMPLE

In order to quantify the improved performance of the above described control arm with ball joint, Example prototype ball joints were manufactured and cycle tested. The Examples and OEM ball joints underwent life cycle testing where axial loads, radial loads, and rotational torque where applied, as well as swinging motion of the ball joint through it's full range of motion simultaneously. Periodically during cycles the ball joints are removed from the test apparatus and measurements are taken of the axial play and radial play that has developed due to bearing wear and other forms of deterioration. In addition, the swing torque and rotational torque are measured.

Since the Example ball joints have axially moveable bearings 22 that are spring loaded axially with the spring washer 29 against the ball head 15 it was expected that at least a degree of axial play would be compensated for by moving the bearing 22 axially. Due to metal-on-metal contact in the Example ball joints compared to metal-on-polymer bearings in the OEM ball joints, less radial play was expected in the Example ball joints. Further the axial spring loading of the bearing 22 against the ball head 15 was expected to create a greater level of swing torque and rotational torque when compared the OEM ball bearing.

Figure 8:
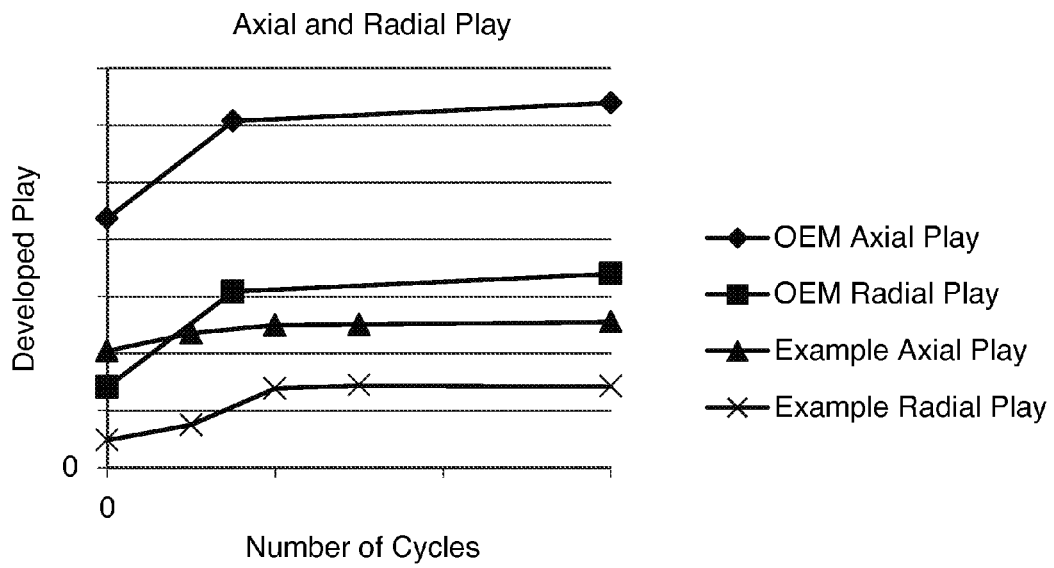
FIG. 8 is a comparison chart showing the results of life cycle testing for axial and radial play that develops in an OEM ball joint and in an Example ball joint constructed in accordance with the present description.
Figure 9:
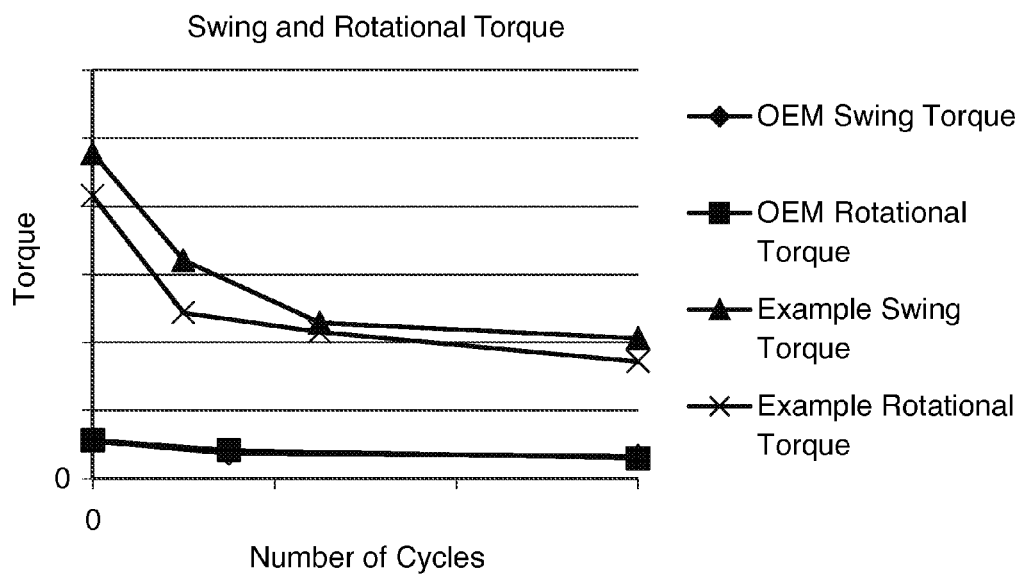
FIG. 9 is a comparison chart showing the results of life cycle testing for swing and rotational torque that deteriorates in an OEM ball joint and in an Example ball joint constructed in accordance with the present description.

A summary of the cycle testing results is illustrated in FIGS. 8 and 9. Analyzing the summarized results clearly shows that the OEM ball joint developed play in the axial and radial directions much sooner in the testing than the Example ball joints. Additionally the swing torque for the OEM ball joint was reduced while the Example ball joint maintained a relatively high swing torque after the same number of cycles.

Vehicles that incorporate non-ferrous or aluminum suspension components that are subject to severe space restrictions and high temperature exposure, have demonstrated premature failure and in the past have not had an aftermarket replacement that improves the performance of the control arm and ball joint assembly. By incorporating sintered metal bearings 22 in a threaded steel housing 21 the control arm assembly with ball joint described herein provides a solution to the durability and heat exposure problems, while retaining the mass and dimensional limits of the original OEM component.

Although the above description relates to a specific preferred embodiment as presently contemplated by the inventor, it will be understood that the invention in its broad aspect includes mechanical and functional equivalents of the elements described herein.

I claim:

1. A control arm assembly for an automotive wheel suspension, comprising:
    an elongate control arm lightweight or non-ferrous material having: an inboard end adapted to pivotally mount to an automotive chassis; and an outboard end having a transverse mounting socket, through an upper mounting surface, the transverse mounting socket having an internally threaded surface and defining an outboard wall between the mounting socket and an outboard sweep surface; and
    a ball joint having: a steel housing with an externally threaded surface and an inner chamber; a ball stud with a partially spherical ball head upwardly restrained within the inner chamber and a shank extending upwardly through an upward opening in the housing; and a bearing having a partially spherical inner surface engaging the ball head and having an outer surface engaging the inner chamber;
    wherein the housing has a laterally extending collar with a lower contact surface that engages the upper mounting surface of the control arm when the threaded surfaces are fully torqued together; and
    wherein the ball head has a center of rotation laterally adjacent an upper portion of the outboard wall, the upper portion having an upper wall thickness greater than or equal to a lower wall thickness of a lower portion of the outboard wall.

2. The assembly of claim 1 wherein the lower portion of the outboard wall is beveled downwardly.

3. The assembly of claim 1 wherein the control arm is forged or cast of non-ferrous metal and the housing is cast or machined from steel.

4. The assembly of claim 1 wherein the threaded surfaces are coated with a thread locking adhesive.

5. The assembly of claim 1 wherein the bearing is a sintered metal bearing.

6. The assembly of claim 5 wherein the bearing is a lower annular ring.

7. The assembly of claim 6 wherein an upper portion of the housing has a partially spherical upper bearing surface.

8. The assembly of claim 7 wherein the housing and ball stud are made of steel, and wherein the partially spherical upper bearing surface and a matching portion of the ball head are case hardened.

9. The assembly of claim 1 wherein the collar has a wrench engaging periphery.

10. The assembly of claim 1 wherein the collar includes a peripheral dust boot retention groove.

11. The assembly of claim 1 wherein the bearing has an outer end and the bearing is resiliently biased against the ball head by a spring washer in engagement with the outer end.

\* \* \* \* \*